July 24, 1928.

H. G. MARTIN ET AL

BEARING

Filed Feb. 19, 1924

1,678,152

Inventor
H.G.Martin
M.H.Newgirg

By

Attorney

Patented July 24, 1928.

1,678,152

UNITED STATES PATENT OFFICE.

HAROLD G. MARTIN, OF PHILADELPHIA, PENNSYLVANIA, AND MICHAEL H. NEWGIRG, OF BALTIMORE, MARYLAND, ASSIGNORS TO MARTIN & NEWGIRG, INC., OF BALTIMORE, MARYLAND, A CORPORATION OF MARYLAND.

BEARING.

Application filed February 19, 1924. Serial No. 693,872.

This invention relates to an improvement in bearings designed more particularly for use in connection with locomotives, and constructed with a view to avoiding serious objections present in the standardized type of such bearings.

Ordinarily bearings of this character have their relatively outer or box engaging surfaces of the same material as the bearings, ordinarily known as "brass" and this whether the bearing is of the solid brass type or whether such bearing contains an embedded reinforce of a different metal to protect the bearing against breakage. These bearings, particularly in the case of the crown bearing, are forced into the box under great pressure, and as the outer brass surface of the bearing is naturally much softer than the metal of the box, there is a shearing action of this brass material of the bearing as it is forced into the box, which of itself results ordinarily in a perfect fit when the bearing is first applied. However, the constant pounding to which these bearings and particularly the crown bearing is subjected in action, tends to gradually compress the brass material, with the result that the fit of the bearing in the box is properly maintained for a comparatively short period of use. There is another and important reason for this lack of proper fit following a short use of the bearing, in that the bearing box, ordinarily of steel, is in the ordinary type of bearing brought into direct contact with the brass on the outer surface of the bearing. This places in contact two metals of widely divergent coefficients of expansion and contraction, and as the bearing becomes heated in use and cooled following use, there is an alternate varied expansion and contraction of the metals forming the bearing and box and a consequent looseness in the fit of the bearing.

It is therefore one of the principal objects of the present invention to provide a brass bearing, otherwise standard, with a metallic reinforce of a strengthening metal, and permit this reinforce to form, wholly or in part, the relatively outer surface of the brass bearing. The reinforce is formed with openings, through which the brass flows in casting to intimately connect the reinforce and brass, but the essential object is the utilization of the reinforce, preferably a steel plate, that is, of similar material to that of the box, as a direct bearing surface against the metal of the box. Thus when the bearing is forced into position, as in a crown bearing, or otherwise applied as in the connecting rod or the bearings or bushings for the parallel rods, the contact between the brass bearing proper and the box is that directly resultant from close engagement of exactly similar metals, so that under the heating and cooling of the bearing and box, the coefficients of expansion and contraction of the contacting metals is exactly the same, hence there is no tendency to looseness as a result of this contraction and expansion.

Furthermore, and more particularly in connection with the crown bearing, experience has demonstrated that by reason of the pounding incident to the play of the wheels, a high spot gradually develops in the longitudinal center of the bearing at the highest point, and as the bearing wears in use, this high spot causes a pounding of the bearing. The invention is also designed to take care of this object by providing the crown bearing particularly, and others where necessary, with a longitudinally extending recess of appreciable depth, cut in the inner surface of the bearing to eliminate metal throughout the area where, in the ordinary bearing, the high spot is formed. This provision permits the bearing to wear true even under the usual play, as the metal which would otherwise tend to form the high spot is entirely eliminated, and the spindle rolls true throughout the full bearing surface of the bearing. This recess or channel while primarily for the purpose of avoiding the high spot, is also of service in receiving and storing, either indirectly or as a result of direct application, a quantity of lubricant for the bearing.

As previously stated, crown bearings are applied to the box under great pressure, as much as thirty tons pressure being used, and as these bearings are extremely heavy, it is, in connection with the standardized bearing, a tedious and lengthly operation to remove these bearings, necessitating the removing of the wheels in practically every instance. The present invention aims also to utilize the reinforce as a means for assisting in removing the bearing, to thereby permit the removal of the bearing without removal of the wheels. Furthermore, the reinforce projection utilized in connection with the removal of the bearing is also in the present invention utilized as a means for fixing the bearing against possibility of lateral displacement, thereby permitting the bearing to remain effective notwithstanding a wear therein, which would otherwise tend to a looseness, and a possible displacement of the bearing.

The invention in its application to bearings designed particularly for use in locomotives, is illustrated in the accompanying drawings, in which.

Figure 1:
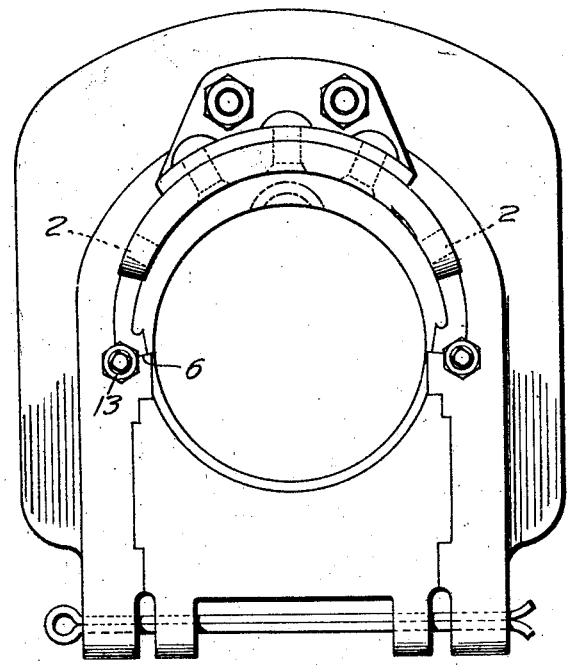
Fig. 1 is a view in elevation showing a crown bearing constructed in accordance with the present invention and in place in the box.
Figure 2:
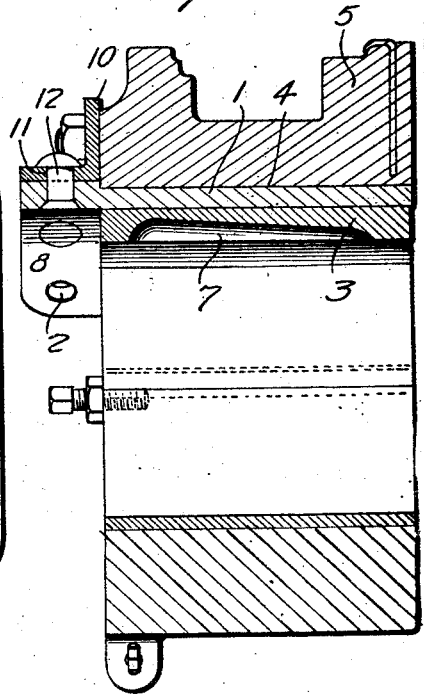
Fig. 2 is a longitudinal section of the same.
Figure 3:
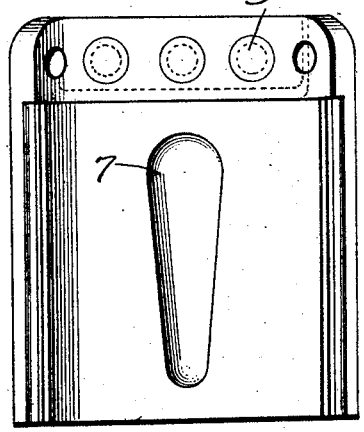
Fig. 3 is a bottom plan view of the crown bearing.

Referring more particularly to Figs. 1, 2, and 3, wherein a crown bearing is shown, such bearing comprises a metallic reinforce 1, preferably of steel or similar metal, formed with openings 2, arranged in any regular or irregular order, and in any relative size or sizes, through which the material 3 is adapted to flow in the casting of the brass with the reinforce in forming the bearing. It will be particularly noted from Fig. 2 of the drawings that this reinforce section 1 provides the direct surface bearing against the inner surface 4 of the box 5, and that as preferred this reinforce metal 1 is of similar material to that of the box, usually steel. The box and bearing are of standard formation, in that the bearing receiving surface of the box has the usual shoulders 6, with which the end edges of the bearing engage when the bearing is forced into position.

As previously described, the use of the crown bearing of standardized form, usually results in a high spot longitudinally of the bearing at the highest point thereof, and to avoid this high spot, the improved bearing is formed with a longitudinally extending recess 7, throughout this high spot area, which recess is preferably though not necessarily of slightly greater width and depth at the inner end of the bearing than at the outer end, as clearly shown in Fig. 2.

To provide for convenient removal of the bearing, the reinforce 1 is extended at the inner end of the bearing beyond the brass and box to provide a flange 8, and this flange is formed with a series of openings 9, which in addition to receiving the connection of the turn buckle ordinarily employed in removing the bearing is also adapted to provide a means for fixing the bearing as a whole with relation to the box against displacement without regard to the looseness resulting from wear. For this purpose, the box may be provided with an L-shaped strip 10, the lateral portion of which is designed to overlie and contact with the reinforce flange 8 when the bearing is in place, the lateral portion of this strip being formed with openings 11 to register with certain of the openings 9 in the reinforce flange to permit the insertion of rivets 12 or other appropriate securing means.

In the improved crown bearing as described, it will be noted that the bearing when applied has that surface adapted to contact with the surface of the box of substantially the same material as that of the box, with the result that when the bearing is forced into position, there is secured a most intimate frictional engagement of these metals, and more particularly as the bearing heats and cools, there is little liability of the separation of the reinforce and contacting metal of the box, as the coefficients of expansion and contraction of these materials is substantially the same. Furthermore, the provision of the recess 7 by eliminating the metal which is otherwise subjected to less wear and the resultant formation of a high spot, causes the bearing to wear true and absolutely prevents the high spot formation. This recess is also conveniently adapted for the accumulation or reception of a suitable lubricant to assist in the lubrication of the bearing. The provision of the flange 8 as an extension of the reinforce provides for the removal of the bearing without the necessity of removing the wheels, the only requirement being to jack up the body from the wheel spindle and exert a sufficient pull upon the bearing through appropriate means connected in the openings 9 of the reinforce flange 8. This flange 8 also serves as a means for positively fixing the bearing against longitudinal displacement under any conditions of wear or use, and in this connection it may be preferred to provide additional securing means, such for example, as threaded bolts 13 which are trapped into openings formed at the juncture of the lower edges of the bearing and the box, these openings being of course partly formed in the bearing and partly in the box.

Of course it is to be understood that the reinforce has the desired and important function of so strengthening the brass as to prevent fracture of the bearing in use. Standardized bearings constructed wholly of brass having comparatively short life, incident in the crown bearings to the fracture of the brass and in the connecting rod bearings and bushings to such wear, as to render them too loose to provide safe operation. The reinforce tends to prevent this complete fracture of the bearing and also tends to prevent undue wear which would tend to a looseness of the bearing. It may be, and frequently has occurred in practice, that the brass material of the bearing becomes fractured or cracked under strain, but as the reinforce resists fracture or cracking, the fracture or cracking of the brass material per se is of little moment in the effectiveness of the bearing as such, and bearings have been used in actual tests for many thousands of miles fully effective and passing all Government and other inspections with the brass material proper cracked entirely through, the reinforce remaining intact and holding the brass proper in its original formation notwithstanding that it may be separated completely through.

Claims:

1. A crown bearing for locomotives or the like, having a longitudinal recess formed in its bearing surface at substantially the peak of the bearing, said recess being of increasing width and depth toward the inner end of the bearing, the crown bearing comprising a reinforce plate and a brass section intimately associated in casting, the reinforce plate being etxended beyond the end of the brass section to provide a flange for use in withdrawing the bearing from the box.

2. A crown bearing for locomotives or the like, having a longitudinal recess formed in its bearing surface at substantially the peak of the bearing, said recess being of increasing width and depth toward the inner end of the bearing, the crown bearing comprising a reinforce plate and a brass section intimately associated in casting, the reinforce plate being extended beyond the end of the brass section to provide a flange for use in withdrawing the bearing from the box, said reinforce plate forming substantially the outer surface of the bearing.

3. A crown bearing for locomotives or the like, having a longitudinal recess formed in its bearing surface at substantially the peak of the bearing, said recess being of increasing width and depth toward the inner end of the bearing, the crown bearing comprising a reinforce plate and a brass section intimately associated in casting, the reinforce plate being extended beyond the end of the brass section to provide a flange for use in withdrawing the bearing from the box, and means whereby said flange may be secured to the box.

4. A crown bearing for locomotives or the like, having a longitudinal recess formed in its bearing surface at substantially the peak of the bearing, said recess being of increasing width and depth toward the inner end of the bearing, the crown bearing comprising a reinforce plate and a brass section intimately associated in casting, the reinforce plate being extended beyond the end of the brass section to provide a flange for use in withdrawing the bearing from the box, a strip secured to the box and having a portion to overlie and engage the flange, and means for connecting said flange and strip.

In testimony whereof we affix our signatures.

HAROLD G. MARTIN. [L. S.]
MICHAEL H. NEWGIRG. [L. S.]